(12) United States Patent
Pohr

(10) Patent No.: US 8,567,326 B2
(45) Date of Patent: Oct. 29, 2013

(54) SECONDARY AIR SEEDER ASSEMBLY AND SYSTEM USING THE SAME

(76) Inventor: Fred Pohr, Bluesky (CA)

( * ) Notice: Subject to any disclaimer, the term of this patent is extended or adjusted under 35 U.S.C. 154(b) by 382 days.

(21) Appl. No.: 12/880,104

(22) Filed: Sep. 12, 2010

(65) Prior Publication Data

US 2011/0219995 A1    Sep. 15, 2011

Related U.S. Application Data

(60) Provisional application No. 61/311,874, filed on Mar. 9, 2010.

(51) Int. Cl.
*A01B 76/00*    (2006.01)

(52) U.S. Cl.
USPC .............. 111/59; 111/174; 111/200; 172/776

(58) Field of Classification Search
USPC ..................... 111/14, 52, 59–73, 79–81, 170, 111/174–188, 118–129, 200; 172/776
See application file for complete search history.

(56) References Cited

U.S. PATENT DOCUMENTS

| | | |
|---|---|---|
| 1,633,821 A | 6/1927 | Mader |
| 4,120,365 A | 10/1978 | Kuhn |
| 4,195,696 A | 4/1980 | Lundin |
| 4,308,921 A | 1/1982 | Davis |
| 4,426,096 A | 1/1984 | Rodrigues, Jr. et al. |
| 5,709,271 A * | 1/1998 | Bassett .............................. 172/4 |
| 5,992,699 A | 11/1999 | Johnson et al. |
| 7,063,166 B1 | 6/2006 | Grosberg |
| 2007/0052203 A1 * | 3/2007 | Friggstad ...................... 280/444 |
| 2007/0245939 A1 | 10/2007 | Gehrer et al. |

FOREIGN PATENT DOCUMENTS

GB    604369    5/1946

* cited by examiner

*Primary Examiner* — Christopher J Novosad
(74) *Attorney, Agent, or Firm* — Maxey Law Offices, PLLC; Stephen Lewellyn

(57) ABSTRACT

A secondary air seeder assembly for depositing seed along the tire tracks formed by an air seeder cart and system comprising the same is provided. The secondary air seeder assembly includes includes first and second elongated and parallel main frame members, each having a terminal forward end and a terminal down turned rearward end. First and second elongated and parallel transverse frame members are connected to and extend between the first and the second main frame members at a longitudinal spaced distance from one another. Two forward caster wheels, one is connected at each terminal forward end of the first and the second main frame members. Two rearward wheels, one is connected at each terminal down turned rearward end of the first and the second main frame members. First and second elongated coupling frame members, are each connected at first end thereof to the first transverse frame member at a spaced distance and connected together at a second end thereof forming a hitch point. A hitch is located at the hitch point. One or more dry material applicator assemblies are connected to the second transverse frame member between the first and the second main frame members. One or more dry material applicator assemblies connected to the first transverse frame member between the first and the second main frame members.

5 Claims, 4 Drawing Sheets

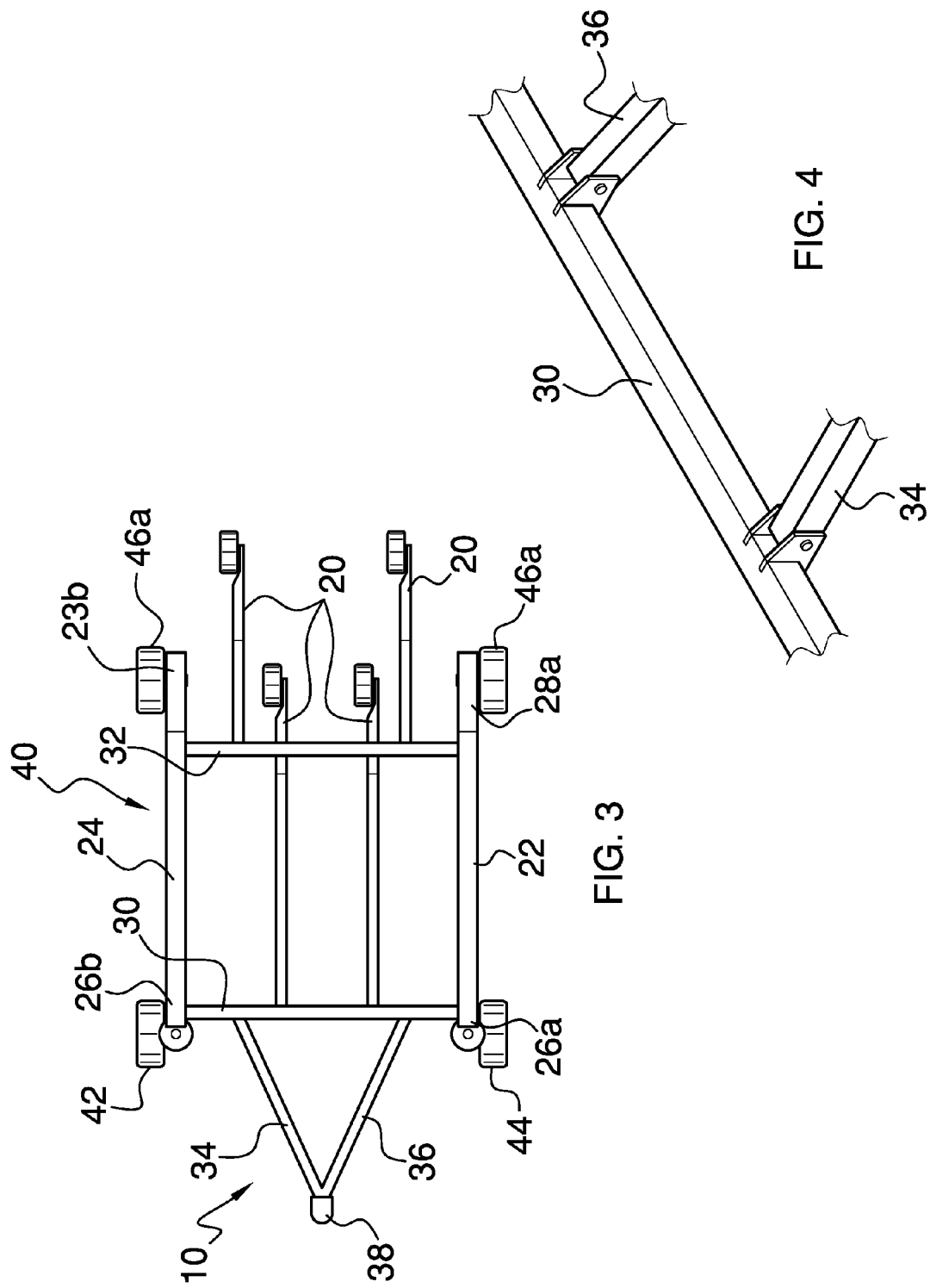

SECONDARY AIR SEEDER ASSEMBLY AND SYSTEM USING THE SAME

CROSS-REFERENCE TO RELATED APPLICATIONS

This application claims the benefit of U.S. Provisional Application No. 61/311,874, filed Mar. 9, 2010, the entirety of which is incorporated herein by reference.

FIELD OF THE INVENTION

The present invention relates generally to the field of agricultural machinery, and more particularly, relating to a secondary air seeder for the planting of seed along the tire tracks created by the tires of a forwardly positioned air cart.

BACKGROUND OF THE INVENTION

An air seeder is an agricultural implement also called a planter or seeder and it is used to plant a seed crop in a large field. Air seeders include an air cart including hoppers for seed and fertilizer. An air stream created by a fan mounted on the air cart blows air through delivery tubes connected to the hoppers. Seed and fertilizer are metered out from the hoppers and enter the delivery tubes where the seed and fertilizer are carried by the air stream and deposited across the field. Openers pulled through the field soil make the opening where the seed and fertilizer are placed.

A problem exists from the tires of the air cart compacting the soil and leaving tire tracks comprised of a strips of compressed soil. The seed planted by the air seeder located within these strips of compressed soil are less likely to germinate as a result of being soil compacted as the tires of the air cart rolls across the planted seed. Accordingly, a need exists that solves the problem of soil compaction by the tires of the air cart rolling over planted seed.

SUMMARY OF THE INVENTION

The embodiments of the present invention addresses this need by providing a secondary air seeder that is attached to and towed behind an air cart to plant seed along tire tracks created by the tires of the air cart.

To achieve these and other advantages, in general, in one aspect, a secondary air seeder assembly is provided. The secondary air seeder assembly includes first and second elongated and parallel main frame members, each having a terminal forward end and a terminal down turned rearward end. First and second elongated and parallel transverse frame members are connected to and extend between the first and the second main frame members at a longitudinal spaced distance from one another. Two forward caster wheels, one is connected at each terminal forward end of the first and the second main frame members. Two rearward wheels, one is connected at each terminal down turned rearward end of the first and the second main frame members. First and second elongated coupling frame members, are each connected at first end thereof to the first transverse frame member at a spaced distance and connected together at a second end thereof forming a hitch point. A hitch is located at the hitch point. One or more dry material applicator assemblies are connected to the second transverse frame member between the first and the second main frame members. One or more dry material applicator assemblies connected to the first transverse frame member between the first and the second main frame members.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 3 is a top view of an air seeder assembly constructed in accordance with the principles of the present invention;

FIG. 4 is a partial perspective view of one of two caster wheels attached to a forward terminal end of a main frame member;

DETAILED DESCRIPTION OF THE INVENTION

Figure 1:
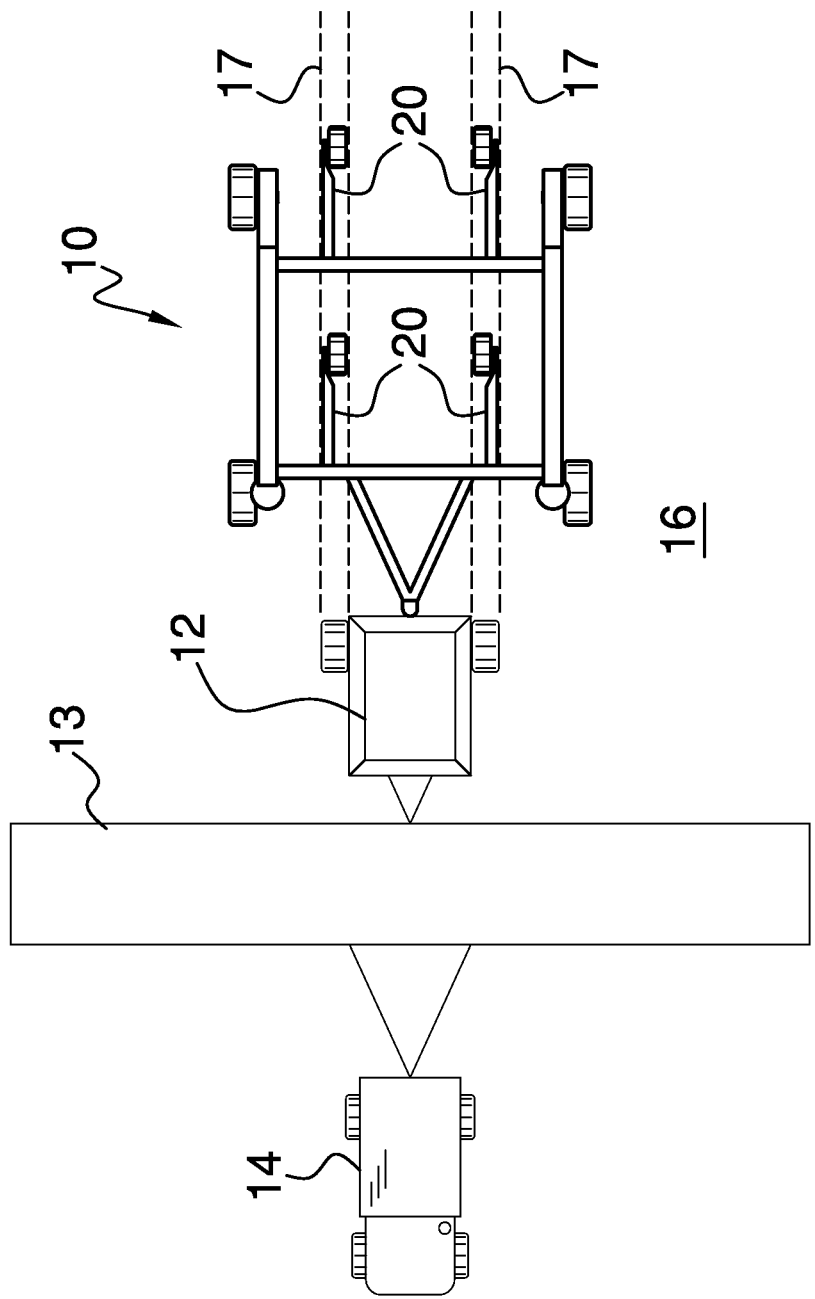
FIG. 1 is a simplified diagrammatic top view of a secondary air seeder assembly and system constructed in accordance with the principles of the present invention.

In FIG. 1, there is shown a simplified diagrammatic view of a secondary air seeder assembly 10 and a system comprising the same. The system includes the secondary air seeder 10, an air seeder cart 12, a primary air seeder assembly 13, and a tractor 14. The air seeder cart 12, the primary air seeder assembly 13 and the tractor 14 are conventional and the details of which are readily known and understood in art.

Accordingly, the air seeder cart 12, the primary air seeder assembly 13 and the tractor 14 are diagrammatic depicted in a simplified form.

In the system, the primary air seeder assembly 13 is connected to the rear of the tractor 14 in a known manner, and the air seeder cart 12 is connected to the rear of the primary air seeder 13 in a known manner to be towed in tandem across the agricultural field 16 for depositing seed and/or related material in a known manner. As the air seed cart 12 traverses across the field 16 tire tracks 17 are created in the top soil of the field by the tires of the air seeder cart. Any seed that has been deposited by the primary air seeder assembly 13 becomes soil compressed in the region of the tire tracks 17 and is less likely to germinate. To solve this problem, the secondary air seeder assembly 10 is connected directly to the rear of the air seeder cart 12, and is configured to deposit seed and/or related material along the tire tracks 17 created by the air cart 12. Material conducting hoses from the air seeder cart 12 to the primary air seeder assembly 13 and the secondary air seeder assembly 10 are not shown for clarity.

Figure 2:
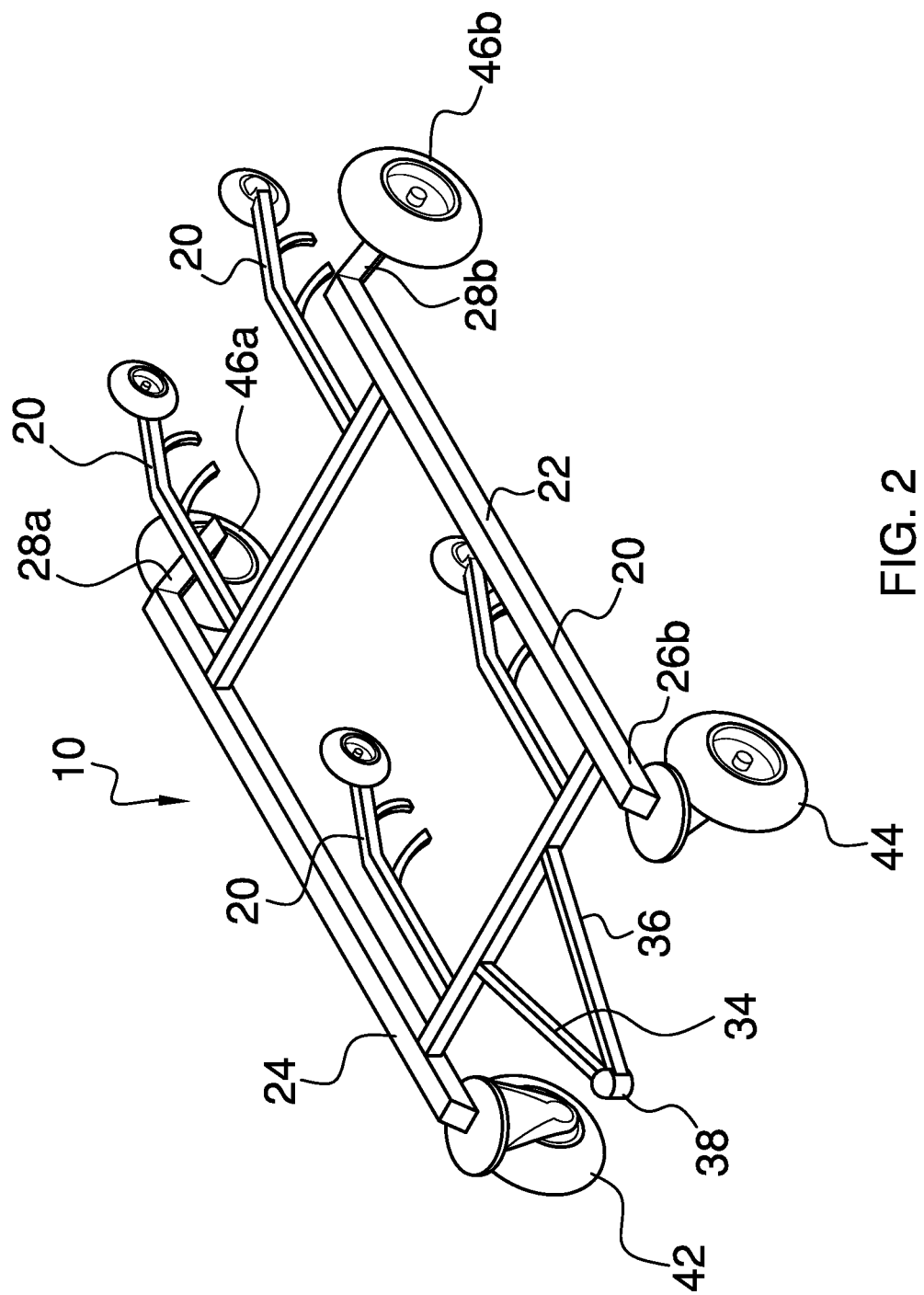
FIG. 2 is a perspective view an air seeder assembly.

With reference to FIGS. 2 and 3, the air seeder assembly 10 comprises a pair of elongated beams or main frame members 22 and 24. Frame members 22 and 24 are parallel to one another and are transversely spaced providing an open frame area. Each frame member 22 and 24 has a forward terminal end 26a and 26b, respectively, and a downward turned rearward terminal end 28a and 28b, respectively. Frame members 22 and 24 are constructed from ridge tubular material. The air seeder assembly 10 further comprises a pair of elongated transverse frame members 30 and 32 that each connected at their respect ends to frame members 22 and 24 and extend therebetween and normal to frame members 22 and 24. Frame member 30 extends at an inward position from forward terminal ends 26a and 26b and frame member 32 extends at an inward position from rearward terminal ends 28a and 28b. Frame members 30 and 32 are parallel and are spaced at a distance. Frame members 30 and 32 are also constructed from a ridge tubular material. The air seeder assembly 10 further comprises a pair of elongated coupling frame members 34 and 36, each connected at first end thereof to frame member 30 at a spaced distance and connected together at a second end thereof forming a hitch point 38. Frame members 34 and 36 are also constructed from a ridge tubular material. Frame members 22, 24, 30, 32, 34 and 36 together form a complete frame 40 for the attachment and support of material applicator assemblies 20. As depicted, at least one material applicator assembly 20 is attached to and supported by each of the frame members 30 and 32 at a position between frame members 24 and 26. Material applicator assemblies 20 are positioned to follow the tire tracks 17. Material applicator assemblies 20 are conventional and the particular details thereof form no part of the invention.

Frame 40 is supported for rolling contact with ground surface 16 by four wheels. Forward caster wheels 40 and 42 are connected to the forward terminal ends 26a and 26b of frame members 22 and 24, respectively. Rearward fixed wheels 44 and 46 are connected to the rearward terminal ends 28a and 28b of frame members 22 and 24, respectively.

In FIG. 4, there is shown a partial perspective view of caster wheel 40 connected to forward terminal end 26a of frame member 22. Here is can be seen caster wheel 40 includes a caster assembly 48 that rotatably connects wheel 40 to forward terminal end 26a for rotation about a vertical axis permitting steering of the air seeder assembly 10 as it is drawn across the ground surface 16. Caster wheel 42 (not shown here) is similarly constructed and connected to forward terminal end 26b of frame member 24.

Figure 5:
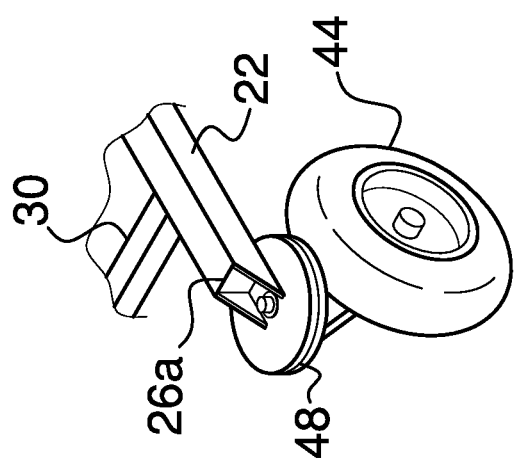
FIG. 5 is a partial perspective view of frame coupling members connected to a transverse frame member.

In FIG. 5, there is shown a partial perspective view of frame member 30 and frame members 34 and 36. Frame member 34 is pivotally connected to frame member 30 by a bracket for rotation about a generally horizontal axis. Likewise, frame member 36 is pivotally connected to frame member 30 at a spaced distance from frame member 34 by a bracket for rotation about a generally horizontal axis. The pivotal connection between frame members 34 and 36 with frame member 30 permits the air seeder assembly to be drawn over uneven ground without causing the wheels thereof from being lifted off the ground surface which other would result in an inconsistent application of material.

Figure 6:
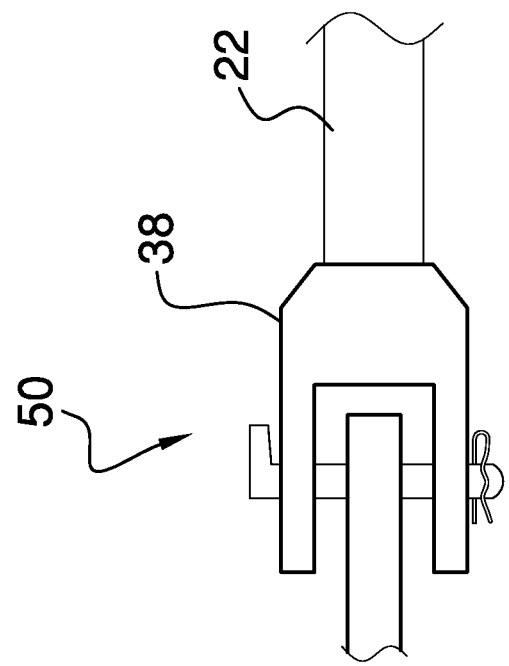
FIG. 6 is a partial view of an exemplary hitch between the air seeder assembly and the air seeder cart.

In FIG. 6, there is shown an exemplary draw hitch 50 located at hitch point 38 that connects the air seeder assembly to the air seeder cart.

A number of embodiments of the present invention have been described. Nevertheless, it will be understood that various modifications may be made without departing from the spirit and scope of the invention. Accordingly, other embodiments are within the scope of the following claims.

What is claimed is:

1. A secondary air seeder assembly for use in connection with a primary air seeder assembly connected to and towed by a tractor and an air seeder cart connected to and towed by the primary air seeder assembly, said secondary air seeder assembly comprising:
   a wheeled frame attached to and towed by the air seeder cart;
   at least one material applicator assembly attached to said wheeled frame and positioned to dispense material within and along a tire track formed in the earth by one or more of the tractor, primary air seeder assembly, and the air seeder cart.

2. The secondary air seeder assembly of claim 1, wherein said wheeled frame includes:
   first and second elongated and parallel main frame members, each of said first and said second elongated and parallel main frame members having a terminal forward end and a terminal down turned rearward end;
   first and second elongated and parallel transverse frame members connected to and extending between said first and said second elongated and parallel main frame members at a longitudinal spaced distance from one another;
   two forward caster wheels, one connected at each terminal forward end of said first and said second elongated and parallel main frame members; and
   two rearward wheels, one connected at each terminal down turned rearward end of said first and said second elongated and parallel main frame members.

3. The secondary air seeder assembly of claim 2, wherein said wheeled frame includes:
   first and second elongated coupling frame members, each connected at a first end thereof to said first elongated and parallel transverse frame member at a spaced distance and connected together at a second end thereof forming a hitch point; and
   said wheeled frame connected to the air seeder cart at said hitch point.

4. A secondary air seeder assembly for use in connection with a primary air seeder assembly connected to and towed by a tractor and an air seeder cart connected to and towed by the primary air seeder assembly, said secondary air seeder assembly comprising:
   a wheeled frame attached to and towed by the air seeder cart;

at least one material applicator assembly attached to said wheeled frame and positioned to dispense material along a tire track formed in the earth by one or more of the tractor, primary air seeder assembly, and the air seeder cart;

wherein said wheeled frame includes first and second elongated and parallel main frame members, each of said first and said second elongated and parallel main frame members having a terminal forward end and a terminal down turned rearward end;

first and second elongated and parallel transverse frame members connected to and extending between said first and said second elongated and parallel main frame members at a longitudinal spaced distance from one another;

two forward caster wheels, one connected at each terminal forward end of said first and said second elongated and parallel main frame members; and two rearward wheels, one connected at each terminal down turned rearward end of said first and said second elongated and parallel main frame members;

first and second elongated coupling frame members, each connected at a first end thereof to said first elongated and parallel transverse frame member at a spaced distance and connected together at a second end thereof forming a hitch point; and said wheeled frame connected to the air seeder cart at said hitch point.

5. An air seeder assembly comprising:

a tractor;

a primary air seeder assembly connected to said tractor;

an air seeder cart connected to said primary air seeder assembly; and a secondary air seeder assembly comprising:

a wheeled frame attached to and towed by said air seeder cart; and at least one material applicator assembly attached to said wheeled frame and positioned to dispense material within and along a tire track formed in the earth by one or more of the tractor, primary air seeder assembly, and the air seeder cart.

\* \* \* \* \*